United States Patent [19]

Boudot et al.

[11] 4,277,285
[45] Jul. 7, 1981

[54] SEALING GLASS WITH HIGH COEFFICIENT OF ABSORPTION FOR INFRA-RED RAYS

[75] Inventors: Jean E. Boudot; Francoise M. M. Roger, both of Avon; Michel P. H. Jeanmaire, Souppes-sur-Loing, all of France

[73] Assignee: Corning Glass Works, Corning, N.Y.

[21] Appl. No.: 109,972

[22] Filed: Jan. 7, 1980

[30] Foreign Application Priority Data

Jan. 12, 1979 [FR] France ................................. 79 00747

[51] Int. Cl.$^3$ ............................ C03C 3/04; C03C 3/10
[52] U.S. Cl. ..................................................... 106/52
[58] Field of Search .......................................... 106/52

[56] References Cited

U.S. PATENT DOCUMENTS

| 3,672,919 | 6/1972 | Sack ........................................ 106/52 |
| 3,698,921 | 10/1972 | La Grouw et al. .................... 106/52 |
| 3,814,612 | 6/1974 | Inoue et al. ............................. 106/52 |
| 3,949,335 | 4/1976 | Morgan .................................. 106/52 |
| 4,001,741 | 1/1977 | Lindig et al. .......................... 106/52 |

Primary Examiner—O. R. Vertiz
Assistant Examiner—Mark Bell

Attorney, Agent, or Firm—Clinton S. Janes, Jr.

[57] ABSTRACT

This invention is concerned with sealing glasses exhibiting a coefficient of absorption of infra-red radiation within the range of 0.7-4 microns of at least 98%, an average coefficient of thermal expansion over the range of 20°-300° C. between $88-92.5 \times 10^{-7}$/°C., and a volatilization of less than about 200 ppm at the sealing temperature, said glass being essentially free from $K_2O$ and $B_2O_3$ and consisting essentially, in weight percent on the oxide basis as calculated from the batch, of

|  | | |
|---|---|---|
| | $SiO_2$ | 67–73 |
| | $Al_2O_3$ | 3.5–6.0 |
| | $Li_2O$ | 1.0–3.0 |
| | $Na_2O$ | 10–16 |
| | BaO | 3.0–5.5 |
| | $Fe_2O_3$ | 2.0–4.0 |
| | F | 0.1–0.4 |
| | $TiO_2$ | 0–3 |
| | $ZrO_2$ | 0–3 |
| | ZnO | 0–2 |
| $TiO_2 + ZrO_2 +$ | ZnO | 0–4 | the sum of those components constituting at least 98% by weight of the glasses. The glasses are especially suitable as envelopes for reed switches.

1 Claim, No Drawings

SEALING GLASS WITH HIGH COEFFICIENT OF ABSORPTION FOR INFRA-RED RAYS

BACKGROUND OF THE INVENTION

This invention relates to a sealing glass having a high coefficient of absorption for infra-red rays which is particularly useful for making the envelope of a switch with flexible metal blades; this envelope being sealed or welded tightly through the application of infra-red rays.

The fabrication of switches with flexible metal blades or reeds (also called reed switches) is conducted in a closed chamber in an appropriate gaseous atmosphere (reducing or neutral) or in a vacuum. Glass tubes are utilized for making the envelope of the switches and the sealing of each tube to the blades of each switch is effected automatically by a mechanical apparatus with infra-red radiation being applied to the ends of each tube in such a manner as to heat the glass and bring it to a temperature sufficient to seal the blades tightly. The application of infra-red radiation is generally accomplished by using the classic halogen lamp as the source of infra-red radiation, mirrors reflecting the said radiation onto the tube to be sealed.

To be suitable for such an application, the glass must have a certain number of particular properties:
(a) its coefficient of thermal expansion must be compatible with that of the metal constituting the metal contacts;
(b) it must exhibit adequate thermal and mechanical resistance;
(c) it must exhibit a high coefficient of absorption, i.e., greater than 98%, for infra-red radiations within the band of wavelengths ranging approximately from 0.7 to 4 microns;
(d) it must exhibit a low rate of volatilization at the sealing temperature in order to minimize fouling of the apparatus, particularly the reflecting mirrors, and contamination of the metal blades inside the switch itself; and
(e) it must exhibit a relatively low sealing temperature to reduce the amount of energy to be added for securing the sealing or welding.

A commercial glass commonly used for such an application is sold by Corning Glass Works under Code No. 9365 in its catalog. The composition of this glass, in weight percent, consists of about:

| | |
|---|---|
| $SiO_2$ | 70.38% |
| $Al_2O_3$ | 2.90 |
| $Li_2O$ | 0.68 |
| $Na_2O$ | 8.85 |
| $K_2O$ | 6.20 |
| BaO | 7.75 |
| F | 0.64 |
| $Fe_2O_3$ | 2.90 |

This glass, however, has a rate of volatilization on the order of 320 ppm and a temperature at $10^4$ poises on the order of 1000° C. and it appeared desirable, in order to meet the desires of the customers, to develop a glass having a lower rate of volatilization and sealing temperature.

Accordingly, it is the object of the invention to provide such a glass.

SUMMARY OF THE INVENTION

The invention is concerned with a sealing glass exhibiting a coefficient of absorption of infra-red rays (within the range of 0.7 to 4 microns) of at least 98%, an average coefficient of thermal expansion between 20° and 300° C. of between 88 and $92.5 \times 10^{-7}$/°C., and a low volatilization at the sealing temperature, viz., less than about 200 ppm, characterized in that the composition therefor consists essentially, expressed in weight percent on the oxide basis as calculated from the batch, of

| | | |
|---|---|---|
| | $SiO_2$ | 67–73 |
| | $Al_2O_3$ | 3.5–6.0 |
| | $Li_2O$ | 1.0–3.0 |
| | $Na_2O$ | 10–16 |
| | BaO | 3.0–5.5 |
| | $Fe_2O_3$ | 2.0–4.0 |
| | F | 0.1–0.4 |
| | $TiO_2$ | 0–3 |
| | $ZrO_2$ | 0–3 |
| | ZnO | 0–2 |
| $TiO_2 + ZrO_2 +$ | ZnO | 0–4 | the sum of those constituents representing at least 98% by weight of the glass.

The preferred glasses, based upon the overall properties exhibited thereby, consist essentially, in weight percent on the oxide basis as calculated from the batch, of

| | |
|---|---|
| $SiO_2$ | 70.1–73 |
| $Al_2O_3$ | 4.1–6 |
| $Li_2O$ | 2.1–3 |
| $Na_2O$ | 11–15 |
| BaO | 3–5 |
| $Fe_2O_3$ | 2–4 |
| F | 0.1–0.2 |
| $TiO_2$ | 0–2 |
| $ZrO_2$ | 0–2 |
| ZnO | 0–2 |
| $TiO_2 + ZrO_2 + ZnO$ | 0–4 | the sum of those constituents representing at least 98% of the glass.

The glasses of the invention are prepared in classic fashion by melting a batch of appropriate raw materials providing the above-mentioned constituents of the glass composition. It is possible, for example, to melt a batch at 1420° C. and then proceed to refining at 1470° C. The glass can be easily drawn into tubing via conventional processes without risk of devitrification, the viscosity thereof at the liquidus temperature being greater than 30,000 poises.

As indicated above, $SiO_2$ should constitute 67 to 73% of the glass. Above 73% the viscosity of the glass becomes too high and problems of devitrification appear. Below 67% the properties of the glass become less desirable. $Al_2O_3$ should constitute 3.5 to 6% of the glass. Below 3.5% the glass exhibits mediocre resistance to corrosion, and above 6% the glass becomes too viscous. $Li_2O$ exerts an influence upon the coefficient of thermal expansion of the glass and should be present in amounts between 1–3%, $Na_2O$ should comprise between 10–16% in order to obtain an acceptable compromise between the properties of thermal expansion of the glass and of volatilization at the sealing temperature. BaO should be maintained between 3–5.5% under penalty of taking the coefficient of thermal expansion of the glass outside of the range indicated. Fluoride (F) serves to secure satisfactory viscosity properties to the glass, but should be maintained below 0.4% under penalty of increasing the rate of volatilization. The greater portion of the iron oxide should be present in the ferrous state ($Fe^{+2}$) to confer the property of infra-red ray absorption on the glass, but is recorded in the following table in the form of $Fe_2O_3$ for reasons of convenience. The optional constituents $TiO_2$, $ZrO_2$, and ZnO are self-evidently not indispensable but their presence can be tolerated in the proportions indicated. The addition of $TiO_2$ and $ZrO_2$ can be advantageous in improving the chemical resistance of the glass and for finely adjusting the thermal expansion and viscosity of the glass. $K_2O$ will preferably be essentially absent from the glass because of its excessive volatilization and $B_2O_3$ will also be essentially absent from the glass since its presence is not favorable for reducing the rate of volatilization.

The glasses of the invention can be sealed to alloys such as Niron 52, commonly utilized in the fabrication of reed switch blades. Other than the fabrication of reed switches, the glasses of the invention can be used as an envelope for various electronic devices.

PRIOR ART

U.S. Pat. No. 3,672,919 discloses sealing glass compositions which are heat absorbing and highly electrically insulating consisting essentially, in weight percent on the oxide basis as calculated from the batch, of

| | |
|---|---|
| $SiO_2$ | 52.3–67.2 |
| $B_2O_3$ | 0–5.0 |
| $Al_2O_3$ | 1.2–2.0 |
| $Li_2O$ | 0.5–1.4 |
| $Na_2O$ | 3.5–4.5 |
| $K_2O$ | 11.3–13.0 |
| ZnO | 0–3.5 |
| BaO | 0–6.2 |
| PbO | 0–17.0 |
| $Fe_2O_3$ | 1.5–5.0 |
| CoO | 0–1.0 |
| F | 0–1.9 |

The $Al_2O_3$, $Na_2O$, and $K_2O$ levels place those glasses outside the purview of the present inventive glasses.

U.S. Pat. No. 3,698,921 describes infra-red radiation absorbing glasses suitable as envelopes for reed switches consisting essentially, in weight percent on the oxide basis, of

| | |
|---|---|
| $SiO_2$ | 60–70 |
| $B_2O_3$ | 0–2 |
| $Li_2O$ | 0.5–2 |
| $Na_2O$ | 10–16 |
| $K_2O$ | 0–2 |
| BaO | 6–16 |
| $Al_2O_3$ | 1–4 |
| CaO + MgO | 0–5 |
| FeO | 2–4 |

The content of BaO is too high, there is no caveat against the inclusion of $K_2O$ and $B_2O_3$ (all of the working examples contain those two components), and F is nowhere mentioned in the patent.

U.S. Pat. No. 3,949,335 provides infra-red radiation absorbing glasses useful as envelopes for reed switches consisting essentially, in weight percent on the oxide basis as calculated from the batch, of

| | |
|---|---|
| $SiO_2$ | 46–54 |
| $B_2O_3$ | 2–8 |
| $Li_2O$ | 0–4 |
| $Na_2O$ | 0–12 |
| $K_2O$ | 0–10 |
| $Li_2O + Na_2O + K_2O$ | 8–13 |
| CaO | 0–6 |
| BaO | 13–20 |
| ZnO | 5–10 |
| CaO + BaO + ZnO | 25–35 |
| $TiO_2$ | 0–2 |
| $ZrO_2$ | 0–4 |
| $Fe_2O_3$ | 0.5–5.0 |

The required presence of $B_2O_3$ and the very high BaO content unquestionably separate the patented glasses from those of the instant invention.

U.S. Pat. No. 4,001,741 includes infra-red radiation absorbing glasses for the fabrication of reed switch envelopes consisting essentially, in weight percent on the oxide basis as calculated from the batch, of

| | |
|---|---|
| $SiO_2$ | 50.9–60.4 |
| $B_2O_3$ | 1.5–11.5 |
| $Al_2O_3$ | 2.5–5.3 |
| $Li_2O$ | 0.75–3.0 |
| $Na_2O$ | 6.0–15.0 |
| $K_2O$ | 0–3.8 |
| $Li_2O + Na_2O$ | 8.0–17.3 |
| $Li_2O + Na_2O + K_2O$ | 11.0–19.7 |
| CaO | 0–1.5 |
| BaO | 0–12.9 |
| ZnO | 0–7.3 |
| PbO | 0–17.5 |
| BaO + PbO | 7.0–17.8 |
| $Fe_2O_3$ | 3.3–5.0 |
| $F_2$ | 0–0.7 |
| $Sb_2O_3$ | 0.05–0.1 |
| Sugar | 0.05–0.1 |

The $B_2O_3$ and BaO and/or PbO levels place those compositions beyond the scope of the present inventive glasses.

DESCRIPTION OF THE PREFERRED EMBODIMENTS

As is well known in glass technology, it is possible to use as batch materials the oxides themselves or materials that break down into these oxides at the melting temperatures utilized, for example carbonates. Iron oxide is advantageously provided from ferrous oxalate in such manner to obtain the highest possible ratio $Fe^{+2}:Fe^{+3}$. Fluoride can be introduced by a fluoride or a fluorosilicate.

The following table reports several compositions of glasses, expressed in parts by weight on the oxide basis as calculated from the batch, coming within the scope of the invention which are given by way of example, together with the average coefficient of thermal expansion (Exp.) of the glasses within the range of 20°–300° C. expressed in terms of $\times 10^{-7}/°C.$, the sealing temperature of the glasses taken as the temperature at which the viscosity of the glass is equal to $10^4$ poises expressed in °C., the softening point of the glasses taken as the temperature at which the viscosity of the glasses is equal to $10^{7.6}$ poises expressed in °C., and the rate of volatilization of the glasses at the sealing temperature, expressed in ppm (parts per million). Since the sum of the individual ingredients totals or approximately totals 100, for all practical purposes, the components may be deemed to be present in terms of weight percent. By way of comparison, the composition and properties of Corning Glass Code No. 9365 are also tabulated.

reduction in power has a beneficial effect on the length of the life of the lamps.

TABLE

|  | 1 | 2 | 3 | 4 | 5 | 6 | 7 | 8 | 9 | 10 | Code 9365 |
|---|---|---|---|---|---|---|---|---|---|---|---|
| $SiO_2$ | 71.82 | 71.52 | 71.02 | 71.52 | 71.52 | 71.52 | 71.02 | 71.02 | 71.02 | 71.02 | 70.38 |
| $Al_2O_3$ | 3.94 | 3.95 | 4.45 | 3.95 | 3.95 | 3.95 | 4.45 | 4.45 | 4.45 | 4.45 | 2.90 |
| F | 0.14 | 0.14 | 0.14 | 0.14 | 0.14 | 0.14 | 0.14 | 0.14 | 0.14 | 0.14 | 0.64 |
| $Li_2O$ | 1.67 | 2.91 | 2.41 | 1.91 | 1.91 | 1.91 | 2.41 | 2.41 | 2.41 | 2.41 | 0.68 |
| $Na_2O$ | 13.48 | 12.51 | 13.01 | 13.51 | 13.51 | 13.51 | 13.01 | 13.01 | 13.01 | 13.01 | 8.55 |
| BaO | 5.47 | 5.5 | 5.5 | 3.5 | 3.5 | 3.5 | 4.5 | 4.5 | 4.5 | 3.8 | 7.75 |
| $Fe_2O_3$ | 3.47 | 3.47 | 3.47 | 3.47 | 3.47 | 3.47 | 3.47 | 3.47 | 3.47 | 3.47 | 2.90 |
| $K_2O$ | — | — | — | — | — | — | — | — | — | — | 6.20 |
| $TiO_2$ | — | — | — | 2.00 | — | — | 1.00 | — | — | 1.00 | — |
| ZnO | — | — | — | — | 2.00 | — | — | 1.00 | — | — | — |
| $ZrO_2$ | — | — | — | — | — | 2.00 | — | — | 1.00 | 0.70 | — |
| Exp. | 90.6 | 90.5 | 89.4 | 88.2 | 88.5 | 87.3 | 88.2 | 88.0 | 90.5 | 91.1 | 90.5 |
| $10^4$ Poises | 968 | 960 | 962 | 959 | 976 | 996 | 966 | 972 | 985 | 970 | 1000 |
| $10^{7.6}$ Poises | 632 | 618 | 625 | 636 | 630 | 645 | 628 | 625 | 634 | 631 | 643 |
| Volatilization | 91 | 115 | 151 | 110 | 151 | 105 | 90 | 92 | 100 | 95 | 320 |

The method for measuring the rate of volatilization was as follows: Plates of glass having a surface of 5 cm² and a thickness of 0.5 mm were placed on a platinum plate and heated by Joule effect. The glass plates on the platinum plate were placed in a chamber in which a given vacuum was drawn. A cup-like cover (cupel) of platinum was placed over the glass and completely covering the platinum plate, the distance from the plate to the top of the cupel being about 7 cm. The glass was quickly brought to a temperature corresponding to a viscosity of 6300 poises and kept at that temperature for two minutes.

The volatilized material was condensed on the cupel and assayed. Prior cleaning of the plates is very important and should be done very carefully, the greatest precautions must be taken in handling the cupels to avoid any contamination.

As can be seen, the inventive glasses exhibit a rate of volatilization that is notably less than that of the known glass of comparison (Corning Code No. 9365), and, therefore, will have much less tendency to foul the infra-red sealing apparatus. Likewise, the glasses of the invention can be sealed at a much lower temperature than the glass of comparison. The energy to be added to accomplish sealing is therefore much less, which either permits the production rates to be increased or the power fed to the infra-red lamps to be reduced. Such a Example 10 of the Table provides the best combination of melting behavior properties and, hence, is the most preferred composition.

We claim:

1. A sealing glass exhibiting a coefficient of absorption of infra-red rays within the range 0.7–4 microns of at least 98%, a viscosity at the liquidus temperature greater than 30,000 poises, an average coefficient of thermal expansion between 20°–300° C. of $91.1 \times 10^{-7}/°C.$, and a volatilization of 95 ppm at the sealing temperature, said glass being essentially free from $K_2O$ and $B_2O_3$ and consisting essentially, in weight percent on the oxide basis as calculated from the batch, of:

| | |
|---|---|
| $SiO_2$ | 71.02 |
| $Al_2O_3$ | 4.45 |
| F | 0.14 |
| $Li_2O$ | 2.41 |
| $Na_2O$ | 13.01 |
| BaO | 3.8 |
| $Fe_2O_3$ | 3.47 |
| $TiO_2$ | 1.00 |
| $ZrO_2$ | 0.70 |

* * * * *